(12) United States Patent
Abdulhayoglu

(10) Patent No.: US 10,885,130 B1
(45) Date of Patent: Jan. 5, 2021

(54) WEB BROWSER WITH CATEGORY SEARCH ENGINE CAPABILITY

(71) Applicant: Melih Abdulhayoglu, Montclair, NJ (US)

(72) Inventor: Melih Abdulhayoglu, Montclair, NJ (US)

(*) Notice: Subject to any disclaimer, the term of this patent is extended or adjusted under 35 U.S.C. 154(b) by 388 days.

(21) Appl. No.: 15/202,156

(22) Filed: Jul. 5, 2016

Related U.S. Application Data

(60) Provisional application No. 62/188,368, filed on Jul. 2, 2015.

(51) Int. Cl.
*G06F 7/00* (2006.01)
*G06F 16/9535* (2019.01)
*G06F 16/25* (2019.01)

(52) U.S. Cl.
CPC ........ *G06F 16/9535* (2019.01); *G06F 16/252* (2019.01)

(58) Field of Classification Search
CPC .................................................. G06F 16/9535
See application file for complete search history.

(56) References Cited

U.S. PATENT DOCUMENTS

| | | | | |
|---|---|---|---|---|
| 7,886,000 | B1* | 2/2011 | Polis | H04L 67/2833 709/203 |
| 8,321,444 | B2* | 11/2012 | Mowatt | G06F 16/951 707/763 |
| 9,740,708 | B2* | 8/2017 | Mouline | G06F 16/9537 |
| 10,154,041 | B2* | 12/2018 | Kohli | G06F 21/6254 |
| 2003/0079056 | A1* | 4/2003 | Taylor | H04L 45/00 710/1 |
| 2003/0212673 | A1* | 11/2003 | Kadayam | G06F 16/951 |
| 2006/0287986 | A1* | 12/2006 | Westphal | G06F 16/3322 |
| 2007/0071221 | A1* | 3/2007 | Allen | H04L 61/157 379/265.01 |
| 2008/0250159 | A1* | 10/2008 | Wang | H04L 29/12594 709/239 |
| 2010/0010968 | A1* | 1/2010 | Redlich | G06Q 10/00 707/E17.014 |
| 2010/0023502 | A1* | 1/2010 | Marlow | G06F 16/951 707/E17.017 |
| 2012/0158400 | A1* | 6/2012 | Schmidt | G06F 16/31 704/9 |
| 2012/0324568 | A1* | 12/2012 | Wyatt | H04L 63/101 726/13 |
| 2013/0086699 | A1* | 4/2013 | Polis | H04L 67/20 726/29 |
| 2013/0097279 | A1* | 4/2013 | Polis | H04L 51/12 709/217 |
| 2014/0150097 | A1* | 5/2014 | Carvalho | H04L 51/30 726/22 |
| 2014/0218391 | A1* | 8/2014 | McConnell | G06F 3/04817 345/619 |
| 2014/0344425 | A1* | 11/2014 | Varney | H04L 41/509 709/221 |

* cited by examiner

*Primary Examiner* — Eliyah S. Harper
(74) *Attorney, Agent, or Firm* — Joseph P. Aiena

(57) ABSTRACT

There is provided a browser with default category search engine capabilities and systems, processes for using the browser. The browser provides a system for users to define a specific search engine for specific categories, such as products, including shopping and price comparison, travel, airline ticket comparison, hotel prices, destinations, sports, entertainment, and other popular categories.

6 Claims, 8 Drawing Sheets

WEB BROWSER WITH CATEGORY SEARCH ENGINE CAPABILITY

CROSS REFERENCE TO RELATED APPLICATIONS

This application claims benefit of and priority to U.S. Provisional Application Ser. No. 62/188,368 filed on Jul. 2, 2015 and incorporated by reference in its entirety herein

FIELD OF THE INVENTION

The present invention relates to online searching in a secure manner, more particularly with use of a search feature contained within a browser.

BACKGROUND

Users are not able to define their own category search engine for various categories, such as hotel prices or product prices in the browser that they are using, but for specific needs, it is not enough. People first search for their favorite category search engine (need) through general search engines, then they are making their second search on that engine, which causes tons of time lost and loss of revenue for industries and businesses in each of those categories. Navigational searches through general search engines can be avoided by giving intelligence to a browser which saves times for users.

SUMMARY

The present invention provides a browser with default category search engine definition capabilities. The browser of the present invention allows users to define a specific search engine for specific categories, such as products, (including shopping and price) comparison, travel (such as airline ticket comparison, hotel prices, destinations), sports, entertainment, etc.

The present invention is a web browser which includes at least one search engine which utilizes at least one category for searching the internet by one or more keywords. The browser processes the one or more keywords by comparing the at least one or more keyword(s) with predefined category keywords. The browser launches a category search engine from the at least one search engine upon matching the one or more keywords with the predefined category keywords. The web browser further includes a default search engine different from the category search engine with the browser launching the default search engine upon not matching the keyword with the predefined category keywords. In the web browser of the present invention the search engine includes user defined categories selected from the group comprising products, shopping, price comparison, travel, airline ticket comparison, hotel prices, destinations, sports, entertainment, finance, real estate.

The present invention includes a system for users to define a specific internet search engine within a browser. The system comprises a computer or handheld device having a central processor coupled to a memory device with a non-transitory computer readable storage medium and an input/output device. The central processor is coupled to a network in communication with at least one server. The web browser is stored on the computer or handheld device and has at least one search engine which utilizes at least one category for searching the internet by one or more keyword(s). The browser processes at least one keyword by comparing the keyword with predefined categories of keywords. The browser launches a category search engine from the at least one search engine upon matching the keyword with the predefined category keywords or category of keywords. The category search engine has user defined categories selected from the group comprising products, shopping, price comparison, travel, airline ticket comparison, hotel prices, destinations, sports, entertainment, finance, news, and real estate. Other popular categories can be included as well.

The present invention includes a non-transitory computer readable medium which comprises instructions stored thereon that when executed on a processor coupled to a network perform a series of steps. These include communicating with the network and a server by a web browser downloaded and stored on the computer readable medium. The web browser has at least one search engine which utilizes at least one category for searching the internet by at least one keyword. The computer readable medium processes the at least one keyword by the web browser by comparing the at least one keyword with predefined categories and then launches by the web browser a category search engine from the at least one search engine upon matching the at least one keyword with the predefined categories. The category search engine has user defined categories selected from the group comprising products, shopping, price comparison, travel, airline ticket comparison, hotel prices, destinations, sports, entertainment, finance, news, and real estate, as well as other categories.

The present invention includes a process of launching a search engine which comprises inputting a keyword into an address bar of a browser and processing the keyword by comparing the keyword with a set of predefined keywords to identify a category search engine. The process then selects the category search engine which matches the keyword, and launches the category search engine with the browser upon matching the keyword. The search engine has user defined categories selected from the group comprising products, shopping, price comparison, travel, airline ticket comparison, hotel prices, destinations, sports, entertainment, finance, news, and real estate, as well as any other topic.

BRIEF DESCRIPTION OF THE DRAWINGS

The accompanying drawings illustrate various embodiments of the present system of invention and are part of the specification. The illustrated embodiments are merely examples of the system of present invention and do not limit the scope thereof.

DETAILED DESCRIPTION

Figure 1:
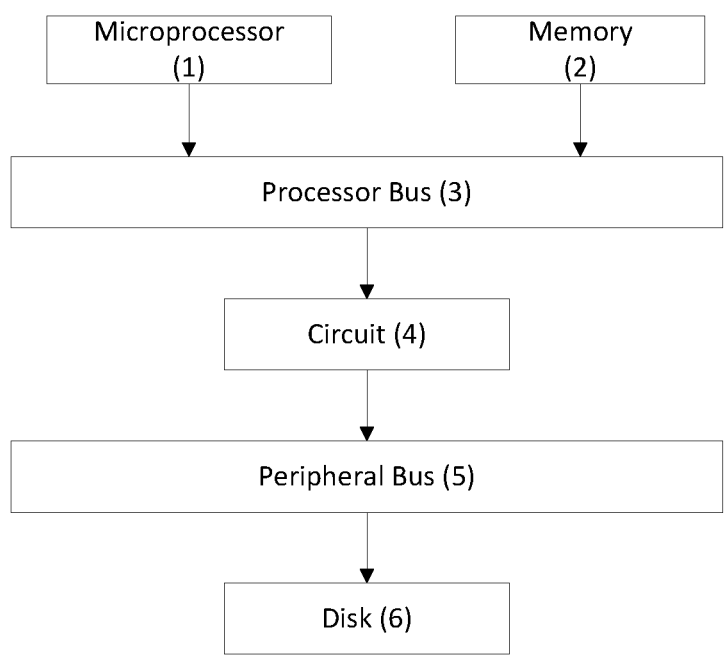
FIG. 1 is a schematic illustration of the connections of a computing system.

FIG. 1 illustrates a system of a computer or device which includes a microprocessor 1 and a memory 2 which are coupled to a processor bus 3 which is coupled to a peripheral bus 5 by circuitry 4. The bus 5 is communicatively coupled to a disk 6. It should be understood that any number of additional peripheral devices are communicatively coupled to the peripheral bus 5 in embodiments of the invention. Further, the processor bus 3, the circuitry 4 and the peripheral bus 5 compose a bus system for computing system 10 in various embodiments of the invention. The microprocessor 1 starts disk access commands to access the disk 6. Commands are passed through the processor bus 3 via the circuitry 4 to the peripheral bus 5 which initiates the disk access commands to the disk 6. In various embodiments of the invention, the present system intercepts the disk access commands which are to be passed to the hard disk.

Figure 2:
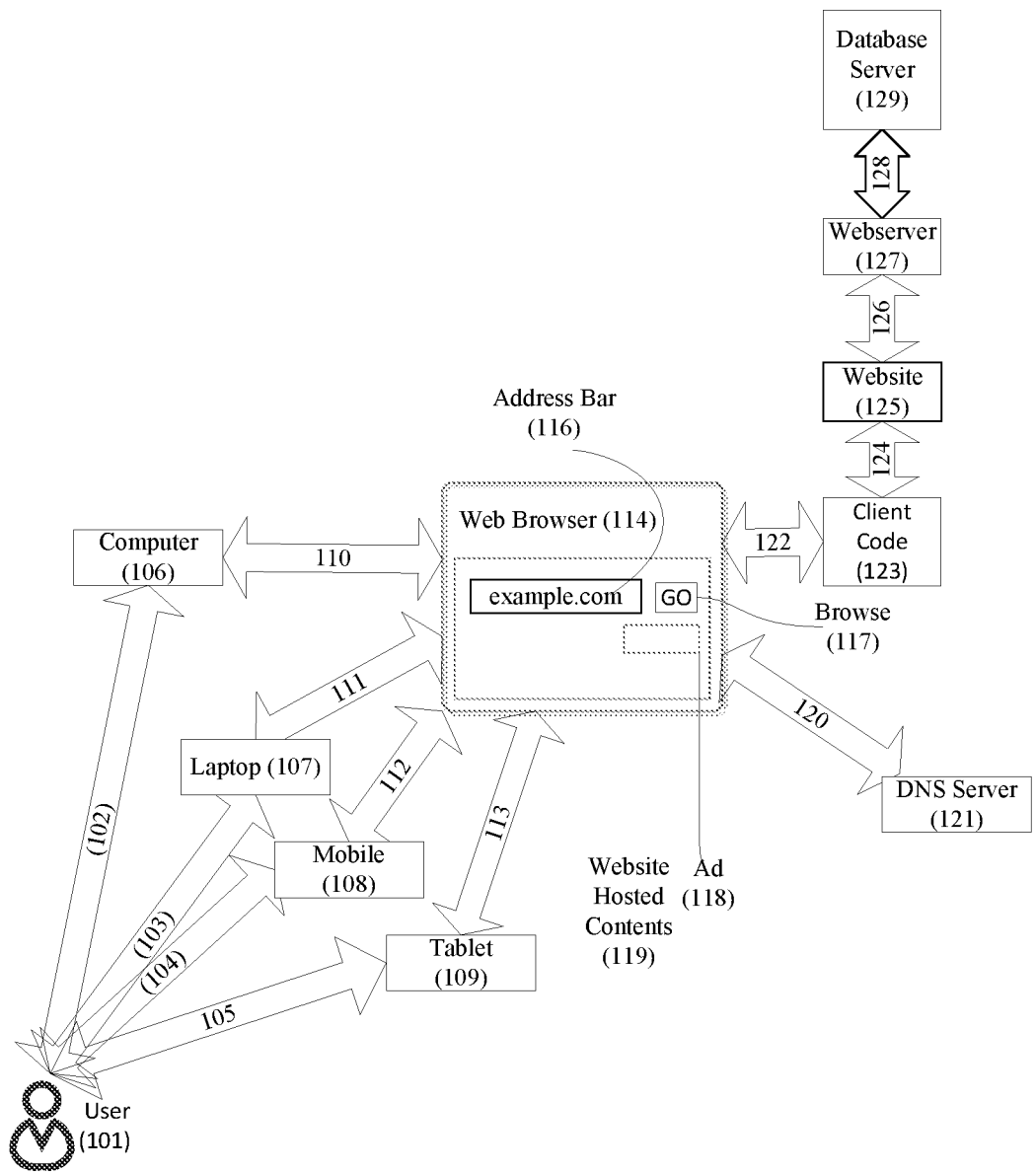
FIG. 2 is a schematic illustration of communication process when the Internet is browsed by a user.

FIG. 2 is a description of how communication works when the web is browsed and shows that a user (101) can use computer (106), laptop (107), mobile (108) or a tablet (109) to launch a web browser (114) installed on that specific device to browse a specific website (123). The user can enter an address of some chosen web site on the address bar (116) and press a browser specific option to indicate to the browser to browse, as shown in FIG. 2 via button "Go" (117). After a user presses a browser specific option to navigate to a given web page as shown in FIG. 2 via button Go (117), web browser (114) first connects to domain name server (121) as configured in that device to resolve the web site domain to the IP address. Any user initiated request and any request made by the code in browser page goes through client code 123 as show via flow arrow 122. Client code has the capability to analyze every passing request and can allow/re-direct or blocks any specific outgoing call. If a call is allowed by client code (123), it is received by web server (127) where web site (125) is hosted. Web server (127) in turn may connect to one or more database server(s) (129) to return specific user requested contents back to web browser (114).

Figure 3:
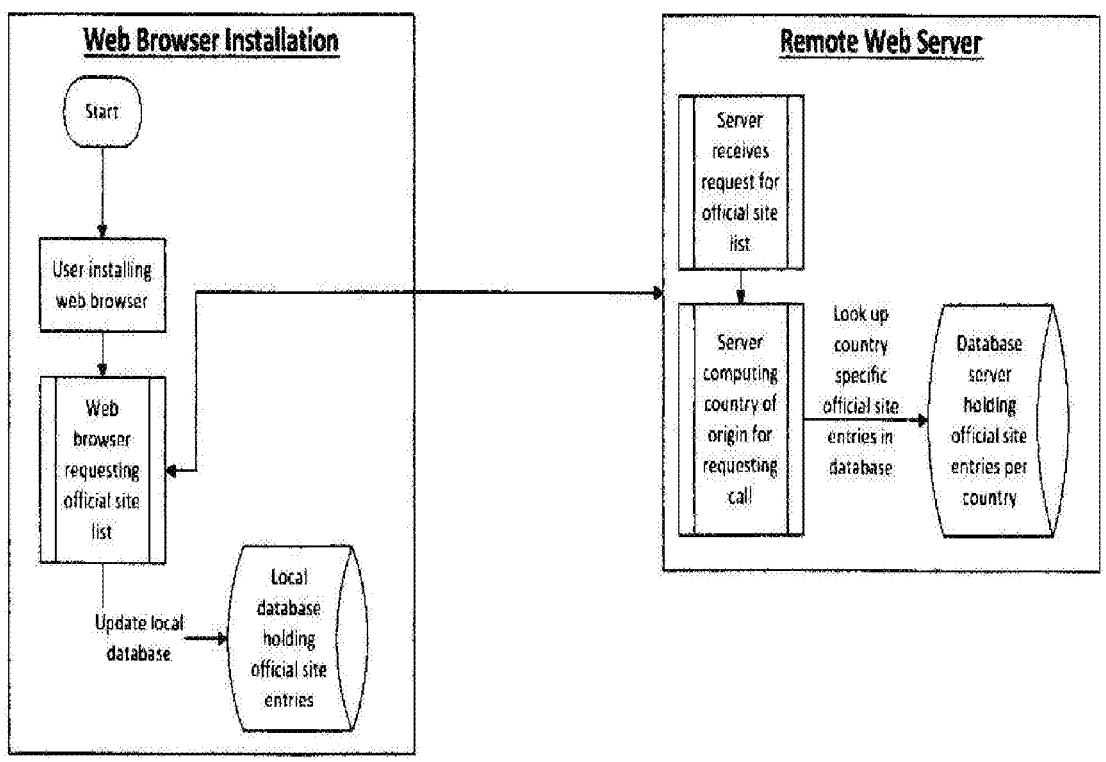
FIG. 3 is a schematic illustration of the present invention with the user downloading from a remote web server.

FIG. 3 is a schematic of the user downloading from a remote web server. The user installs a web browser and then the user requests through the web browser an official site list from the remote web server. The remote web server computes the country of origin for the requesting call and determines the specific official site entries in the database for that country, which are held in the database server. The local database for the web browser is then updated and holds official site entries.

Figure 4:
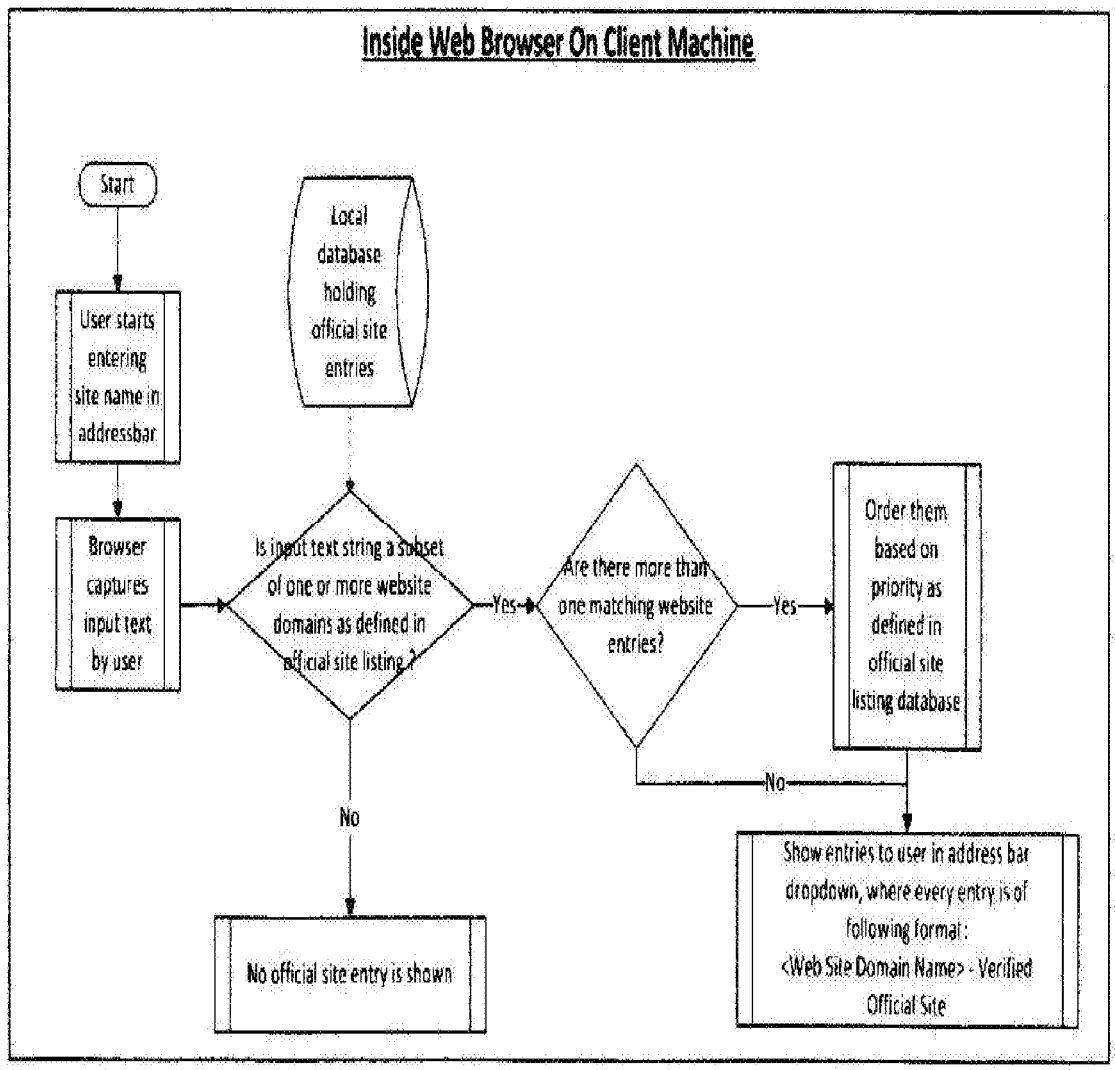
FIG. 4 is a schematic illustration of the present invention in use on a client device.

FIG. 4 illustrates the operation of the web browser on a client machine. The user starts by entering the site name in the address bar. The Browser captures input text by user. The local database holding the official site entries determines if the input text string of one or more website domains is as defined in the official site listing. If no, then no official site entry is shown. If yes, then it is determined if there are more than one matching website entries. If there are, then the order is based on priority as defined in the official site listing database. Entries are then shown to user in Address Bar dropdown, where every entry is of following format: <Web Site Domain Name>—Verified Official Site. If there is no more than one matching website entry, that one entry is shown to the user in the Address Bar dropdown, where the entry is of the following format: <Web Site Domain Name>—Verified Official Site.

Figure 5:
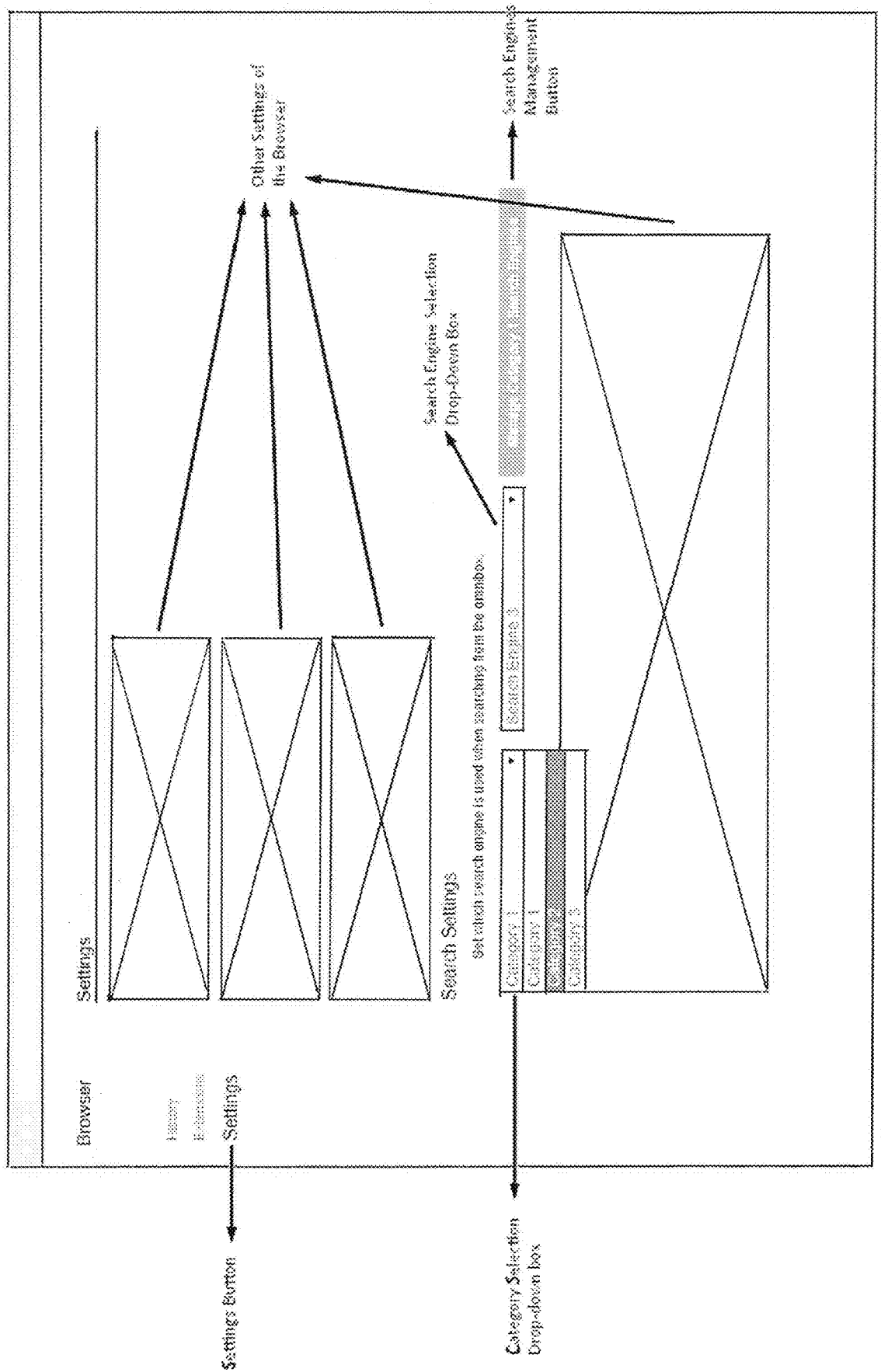
FIG. 5 is a schematic illustrating the search and management features of browser of the present invention.

FIG. 5 is an illustration of a screen capture of the present invention on a user's computer or device. The web browser of the present invention has been downloaded and installed on a user's computer or device, stored at a computer readable medium. In FIG. 5, the web browser of the present invention has been executed and launched by the user from their device which is in communication with a network and server(s). The web browser of the present invention includes a settings section, which includes various other settings of the browser and allows the user to select features he or she chooses. Additionally, the web browser of the present invention has search settings. These search settings allow the user to set which search engine is used when searching from the omnibox. There is also included a category selection drop down box, and a search engine drop down box. Each of these drop down menus contain various categories and search engines for the user to select and define. Further, there is a category search engine management feature or button. This allows the user to manage the category search engines according to the user's desired selections. The user will input a search term into the browser input box, also known as the address bar or omnibox, intended for search and navigation. The browser makes a determination on the entered search term to select an appropriate search category for the search term. The determination decides within which search category the search should be classified and will then execute the search into the search category handler, typically in the form of but not limited to, a local client webpage or an online webpage.

To make the determination matching the search term to the search category, the browser compares keywords and it will use heuristic algorithms. This determination can be carried out locally, or via a call to a web server, or a combination of both local and web service dependent on the browsers current configuration.

The category selection drop down box populates the search engine selections. That is, by selecting a particular category in the category drop down box menu, the user is presented with various search engine options in the search engine drop down box available for the particular category selection.

The categories are selected from various groups including products, shopping, price comparison, travel, airline ticket comparison, hotel prices, destinations, sports, entertainment, finance, and real estate. Any other category may be included, as those of skill in the art would recognize.

Figure 6:
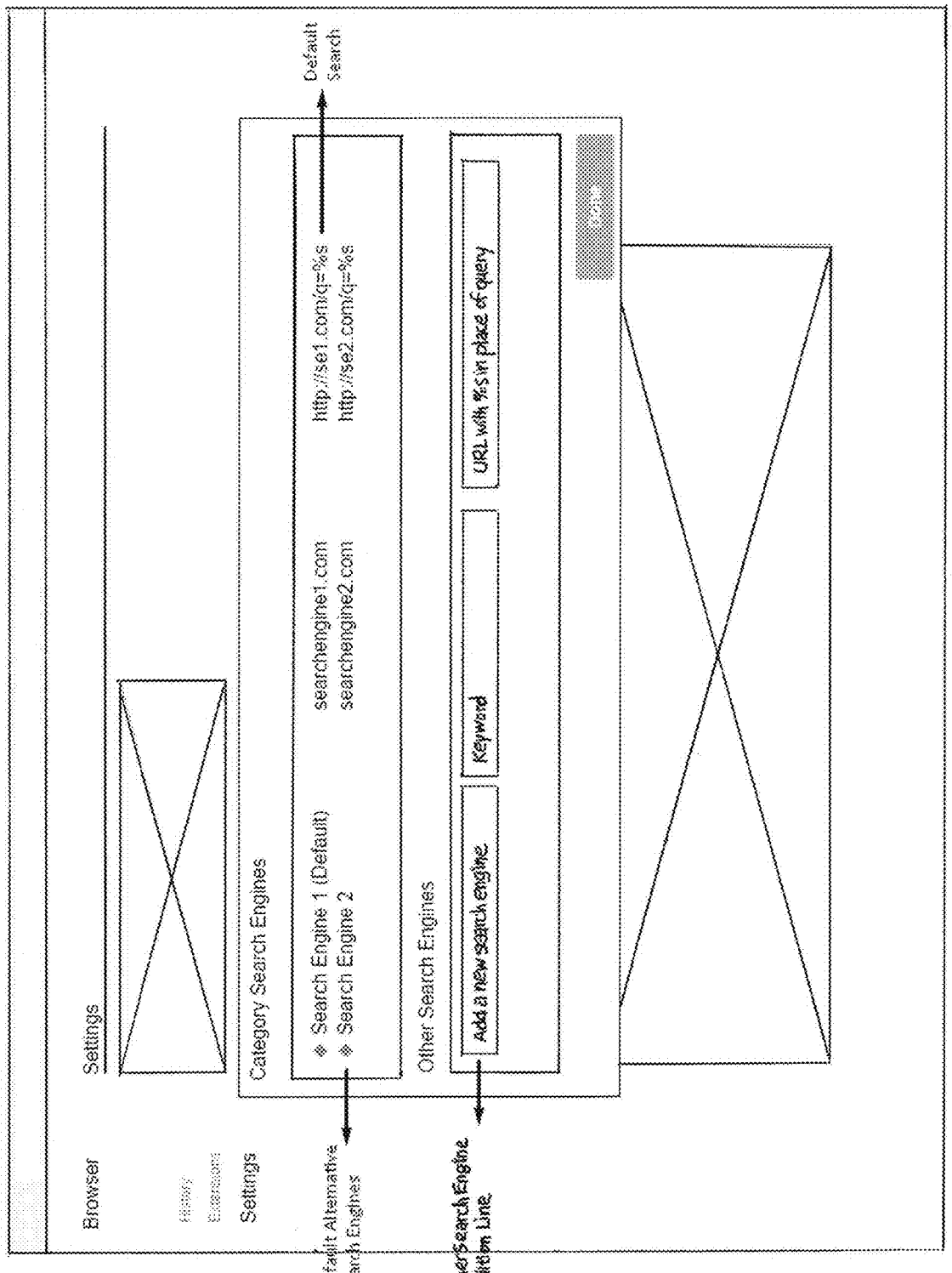
FIG. 6 is a schematic of the category search engine management screen of the present invention.

FIG. 6 illustrates the category specific search engine management screen which allows users to select a default category search engine among predefined search engines, or user defined search engines. To select a default category search engine, the user selects, via a mouse or input device, on the search engine line which displays "Make this default" button or (similar button) and "Delete" or similar button. If user clicks on make this default button, that search engine becomes that category's default search engine. Other search engines can be added as the user chooses as well.

Figure 7:
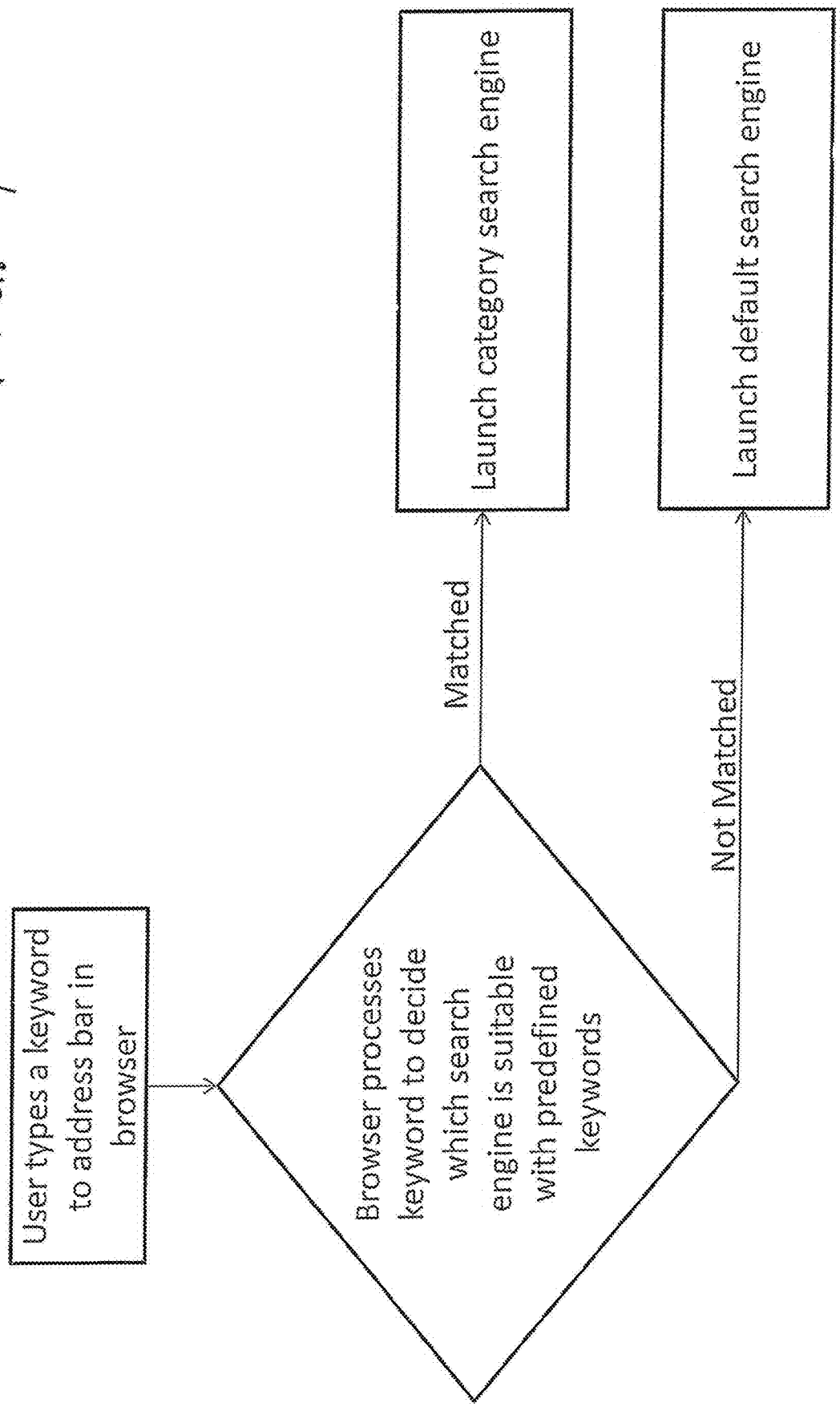
FIG. 7 is a schematic diagram of the decision process of the browser of the present invention.

FIG. 7 illustrates how the present invention operates to utilize the category search engine of the browser. First, the user types a keyword into the address bar in the browser. Then, the browser processes the keyword to decide which search engine is suitable with predefined keywords. If the keyword is matched, then the browser launches the category search engine. If it is not matched, then the browser launches the default search engine. The keywords and predefined keywords may be stored locally on the client computer or at a server as part of a network.

Figure 8:
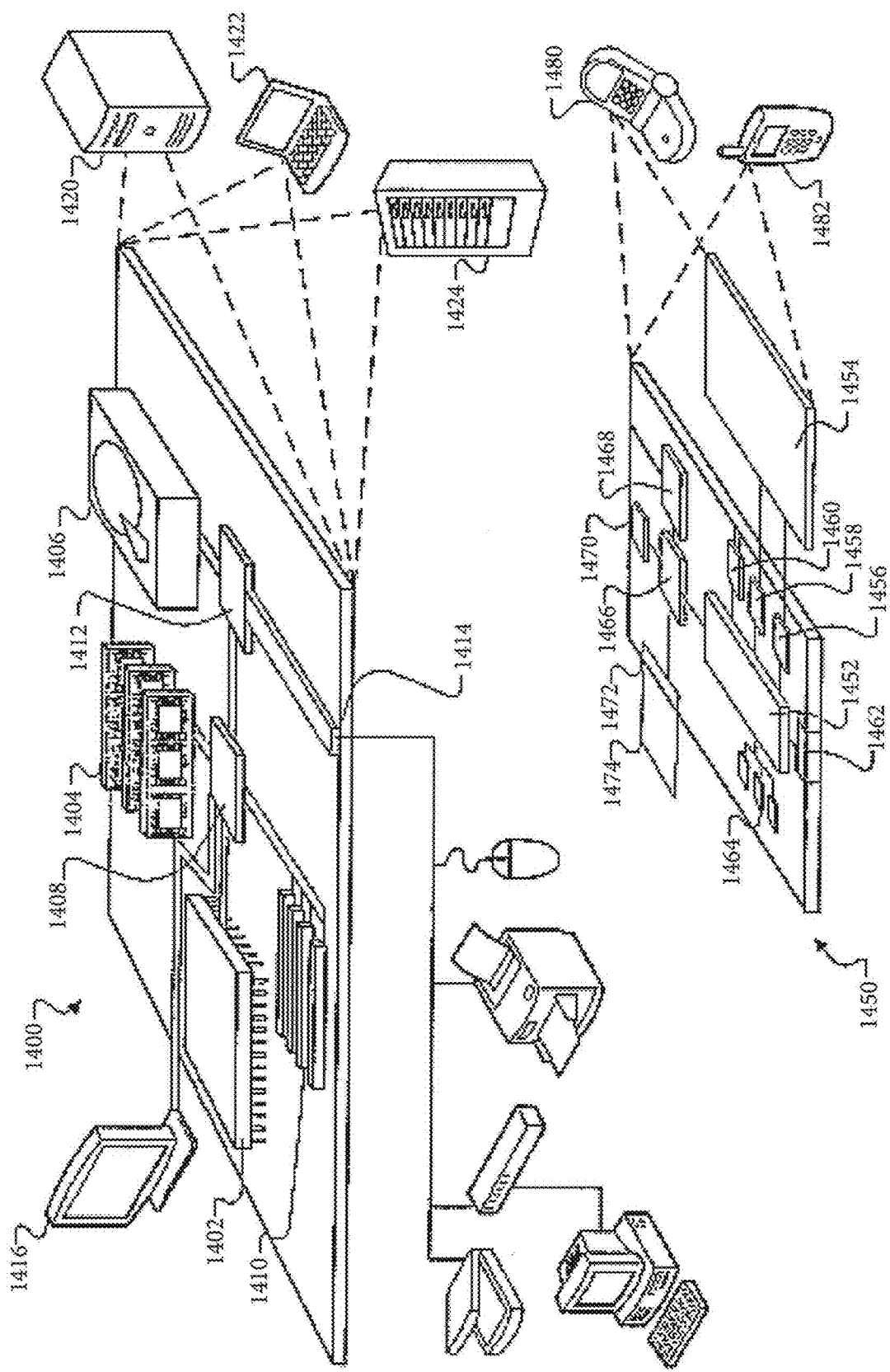
FIG. 8 is an illustration of computer and mobile devices and their components.

FIG. 8 shows an example of a generic computer device 1400 and a generic mobile computer device 1450, which may be used to implement the processes described herein, including the mobile-side and server-side processes for installing a computer program from a mobile device to a computer. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412 are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple busses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port 1414, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468 are interconnected using various busses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, tablet, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "computer readable storage medium" may be any tangible medium (but not a signal medium—which is defined below) that can contain, or store a program. The terms "machine readable medium," "computer-readable medium," or "computer readable storage medium" are all non-transitory in their nature and definition. Non-transitory computer readable media comprise all computer-readable media except for a transitory, propagating signal.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be to provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Further-more, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A web browser comprising:
   a web browser having a setting section comprising category selection and search engine selection, said web browser having included in said web browser at least one search engine which utilizes at least one category for searching the internet by at least one keyword;
   said browser processing the at least one keyword by comparing said at least one keyword with predefined category keywords made on basis of said category selection and said search engine selection wherein said browser uses heuristic algorithms;
   said browser launches a category search engine from said at least one search engine upon matching the at least one keyword with said predefined category keywords made on basis of the category selection and the search engine selection;
   said web browser requesting an official site domain list from a remote web server, said remote web server determining country of origin for said request from said web browser and prioritizes retrieving a country specific official site domain list for said country of origin from a database server and returning said country specific official site domain list to said web browser to update a local database with said country specific official site domain list;
   said browser capturing user input text and determining if said input text is a subset of at least one website domain from said country specific official site domain list contained in said local database;
   said browser returning website entries in priority order based on the heuristic algorithm and country of origin in an address bar dropdown in a format which identifies each of said entries as a verified official website of user defined categories.

2. The web browser of claim 1 further comprising a default search engine different from said category search engine; said browser launching said default search engine upon not matching said keyword with said predefined category keywords made on basis of the category selection and the search engine selection wherein said default search engine displays search results from domain list not present in the said category search engine.

3. The web browser of claim 1, wherein said category search engine includes said user defined categories selected from the group comprising products, shopping, price comparison, travel, airline ticket comparison, hotel prices, destinations, sports, entertainment, finance, real estate.

4. A system for users to define a specific internet search engine within a browser, said system comprising:
   a computer or handheld device having a central processor coupled to a memory device with a non-transitory computer readable storage medium and an input/output device; said central processor coupled to a network in communication with a server;
   a web browser having a setting section comprising category selection and search engine selection, said web browser stored on said computer or handheld device and having included in said web browser at least one search engine which utilizes at least one category for searching the internet by at least one keyword;
   said browser processing the at least one keyword by comparing said at least one keyword with predefined category keywords made on basis of said category selection and said search engine selection wherein said browser uses heuristic algorithms to prioritize results;
   said browser launches a category search engine from said at least one search engine upon matching the at least one keyword with said predefined category keywords made on basis of the category selection and the search engine selection;
   said category search engine having user defined categories selected from the group comprising products, shopping, price comparison, travel, airline ticket comparison, hotel prices, destinations, sports, entertainment, finance, real estate;
   said web browser requesting an official site domain list from a remote web server, said remote web server determining country of origin for said request from said web browser and retrieving a country specific official site domain list for said country of origin from a database server and returning said country specific official site domain list to said web browser to update a local database with said country specific official site domain list;
   said browser capturing user input text and determining if said input text is a subset of at least one website domain from said country specific official site domain list contained in said local database;
   said browser returning website entries in priority order in an address bar dropdown in a format which identifies each of said entries as a verified official website of said user defined categories.

5. A non-transitory computer readable medium comprising instructions stored thereon, that when executed on a processor coupled to a network, perform the steps of:
   communicating with the network and a server by a web browser stored on said computer readable medium, said web browser having a setting section comprising category selection and search engine selection, said web browser having included in said web browser at least one search engine which utilizes at least one category for searching the internet by at least one keyword;
   processing the at least one keyword by said web browser by comparing said at least one keyword with predefined categories made on basis of said category selection and said search engine selection wherein said browser uses heuristic algorithms;
   launching by said web browser a category search engine from said at least one search engine upon matching the at least one keyword with said predefined categories made on basis of the category selection and the search engine selection;
   said category search engine having user defined categories selected from the group comprising products, shopping, price comparison, travel, airline ticket comparison, hotel prices, destinations, sports, entertainment, finance, and real estate;
   said web browser requesting an official site domain list from a remote web server, said remote web server determining country of origin for said request from said web browser and retrieving a country specific official site domain list for said country of origin from a database server and returning said country specific official site domain list to said web browser to update a local database with said country specific official site domain list;

said browser capturing user input text and determining if said input text is a subset of at least one website domain from said country specific official site domain list contained in said local database;

said browser returning website entries in priority order in an address bar dropdown in a format which identifies each of said entries as a verified official website of said user defined categories.

6. The non-transitory computer readable medium of claim 5, wherein the process of launching said category search engine further comprises:

inputting a keyword into an address bar of a browser;

processing the keyword by comparing said keyword with a set of predefined keywords to identify said category search engine;

selecting said category search engine which matches said keyword on basis of the category selection and the search engine selection wherein said browser uses heuristic algorithms, and;

launching said category search engine with said browser upon matching said keyword made on basis of the category selection and the search engine selection; said search engine having user defined categories selected from the group comprising products, shopping, price comparison, travel, airline ticket comparison, hotel prices, destinations, sports, entertainment, finance, and real estate.

* * * * *